United States Patent
Osborne

(10) Patent No.: US 6,874,310 B2
(45) Date of Patent: Apr. 5, 2005

(54) VARIABLE MULCHING SYSTEM FOR A LAWNMOWER

(75) Inventor: Christopher M. Osborne, Hillsborough, NC (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/817,896

(22) Filed: Apr. 6, 2004

(65) Prior Publication Data

US 2004/0187464 A1 Sep. 30, 2004

Related U.S. Application Data

(62) Division of application No. 10/152,772, filed on May 23, 2002.

(51) Int. Cl.[7] .............................................. A01D 67/00
(52) U.S. Cl. .................................................... 56/320.2
(58) Field of Search ...................... 56/202, 194, 320.1, 56/320.2, 16.4 R, DIG. 20, DIG. 24

(56) References Cited

U.S. PATENT DOCUMENTS

| | | | |
|---|---|---|---|
| 3,134,212 A | | 5/1964 | Gary |
| 3,884,020 A | | 5/1975 | Dahl et al. |
| 3,893,284 A | * | 7/1975 | Thon et al. .................. 56/202 |
| 3,949,540 A | * | 4/1976 | Christopherson et al. ...... 56/202 |
| 4,189,904 A | | 2/1980 | Paker |
| 4,726,178 A | | 2/1988 | Mallaney et al. |
| 4,938,011 A | | 7/1990 | Pernia |
| 5,033,260 A | * | 7/1991 | Jerry ........................ 56/320.2 |
| 5,179,823 A | | 1/1993 | Pace |
| 5,191,756 A | | 3/1993 | Kuhn |
| 5,267,429 A | | 12/1993 | Kettler et al. |
| 5,355,666 A | | 10/1994 | McDonner et al. |
| 5,442,902 A | | 8/1995 | Mosley et al. |
| 5,457,947 A | | 10/1995 | Samejima et al. |
| 5,488,821 A | | 2/1996 | McCunn et al. |
| 5,491,964 A | | 2/1996 | Butler |
| 5,499,495 A | | 3/1996 | Heisman et al. |
| 5,826,417 A | | 10/1998 | Evans |
| 5,884,463 A | | 3/1999 | Darzinkis |

FOREIGN PATENT DOCUMENTS

WO       WO 94/10827       5/1994

* cited by examiner

Primary Examiner—Árpád Fábián Kovács
(74) Attorney, Agent, or Firm—Jenkens, Wilson & Taylor, P.A.

(57) ABSTRACT

A lawnmower is convertible between a bagging mode and a mulching mode. The convertible lawnmower includes a cutter housing having a discharge opening, an engine mount centrally positioned on the cutter housing, a prime mover supported on the engine mount, a mulching blade coupled to the prime mover to rotate in a blade circle within the cutter housing, a mounting ring rotatably mounted in the cutter housing, and a plate connected to the mounting ring. The plate translates along an arcuate path in the cutting chamber between a full bagging position where the plate is laterally spaced from the discharge opening and a full mulching position where the plate obstructs the discharge opening.

6 Claims, 8 Drawing Sheets

VARIABLE MULCHING SYSTEM FOR A LAWNMOWER

CROSS-REFERENCE TO RELATED APPLICATIONS

This application is a divisional of U.S. patent application Ser. No. 10/152,772, filed May 23, 2002, incorporated herein by reference in its entirety.

BACKGROUND OF THE INVENTION

Lawnmowers can be configured as garden tractors, riding mowers, commercial walk-behind mowers and smaller walk-behind mowers. Smaller walk-behind mowers include a prime mover mounted to the deck. Mower decks associated with garden tractors, riding mowers and commercial walk-behind mowers are removably attached to the frame of these self-propelled machines in a manner that allows the deck to float along the contour of the terrain above an adjustable minimum height. These floating decks rely on a power take-off connected to the prime mover used to propel these self-propelled machines and, therefore, do not include a prime mover. More than one blade can be mounted in the cutting chamber of the deck for any of these embodiments of a lawnmower.

Lawnmowers can also be configured to either mulch the clippings or to discharge the clippings through a discharge chute. Mulching mowers cut the clippings into fine particles and blow the clippings below the lawn surface. Discharge mowers either discharge the clippings directly onto the lawn surface or into a bag for disposal elsewhere. Some lawnmowers can be converted between mulching lawnmowers and discharge lawnmowers by inserting or removing separate elements within the cutter housing and/or the discharge chute.

SUMMARY OF THE INVENTION

There is provided a lawnmower convertible between a bagging mode and a mulching mode. The convertible lawnmower includes a cutter housing having a discharge opening, an engine mount centrally positioned on the cutter housing, a prime mover supported on the engine mount, a mulching blade coupled to the prime mover to rotate in a blade circle within the cutter housing, a mounting ring rotatably mounted in the cutter housing, and a plate connected to the mounting ring. The plate translates along an arcuate path in the cutting chamber between a full bagging position where the plate is laterally spaced from the discharge opening and a full mulching position where the plate obstructs the discharge opening.

There is also provided a convertible lawnmower including a cutter housing having a discharge opening, an engine mount centrally positioned on the cutter housing, a prime mover supported on the engine mount, a mulching blade coupled to the prime mover to rotate in a blade circle within the cutter housing, a mounting ring mounted in the cutter housing, a cover connected to the mounting ring, and a handle connected to the cover. The cover slides within the cutter housing between a full bagging position where the discharge opening is substantially unobstructed by the cover, a full mulching position where the cover substantially obstructs the discharge opening and at least one position intermediate the full bagging position and the full mulching position. The handle extends external to the cutter housing and is displaceable between a first position, a second position and at least one position intermediate the first position and the second position such that displacement of the handle between each of the first position, the second position and the at least one intermediate position of the handle translates the cover between each of the full bagging position, the full mulching position and the at least one intermediate position of the cover, respectively.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention

DETAILED DESCRIPTION OF THE PREFERRED EMBODIMENT

Figure 1:
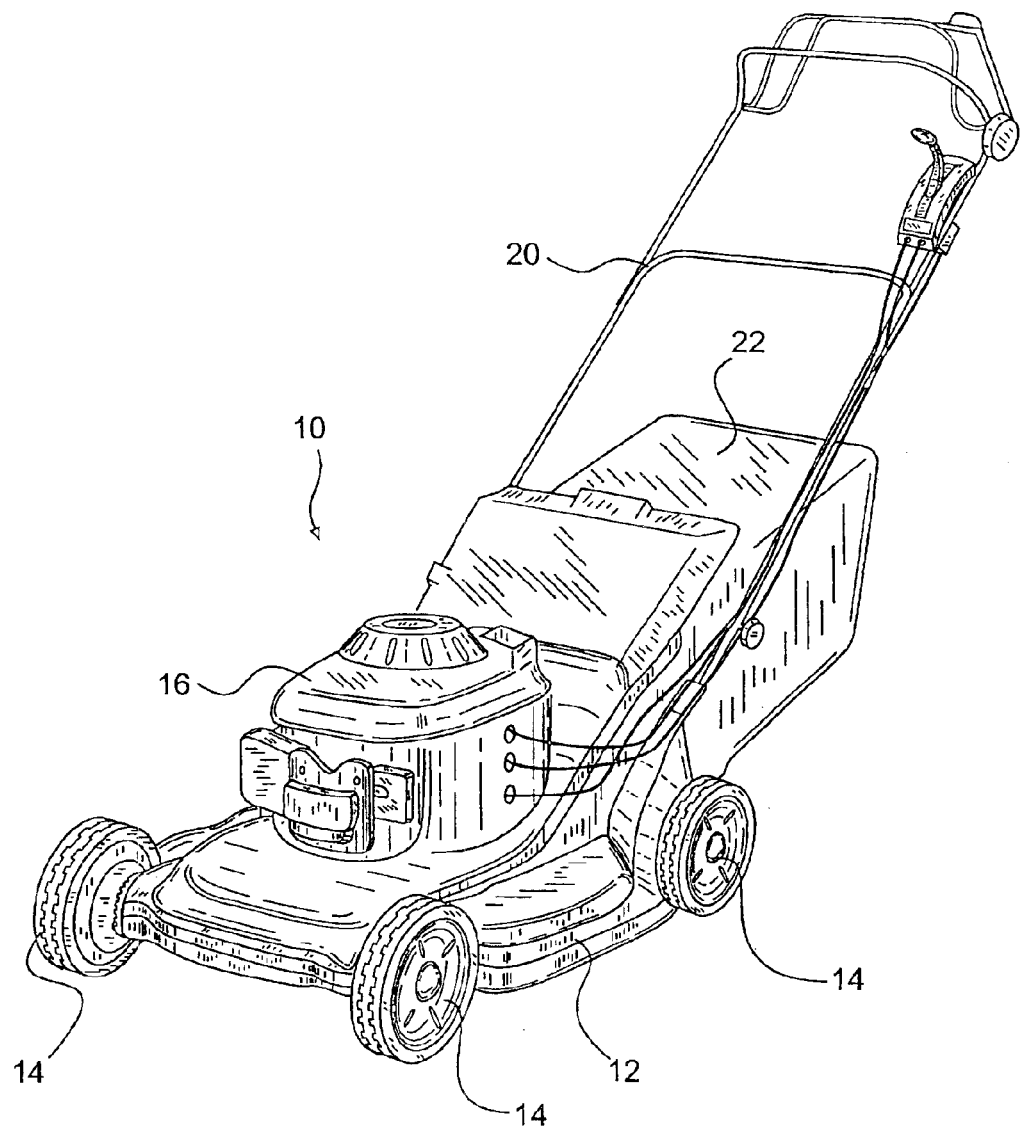
FIG. 1 is a perspective view of a lawnmower according to the present invention.

Referring to FIG. 1, a lawnmower 10 includes a deck 12, wheels 14, a prime mover 16 (e.g., an internal combustion engine or an electric motor) mounted to the deck 12, a blade 18 (see FIG. 2) connected to the prime mover 16 below the deck 12, a steering handle 20 connected to and extending upwardly from the deck 12 and a collection bag 22.

Figure 5:
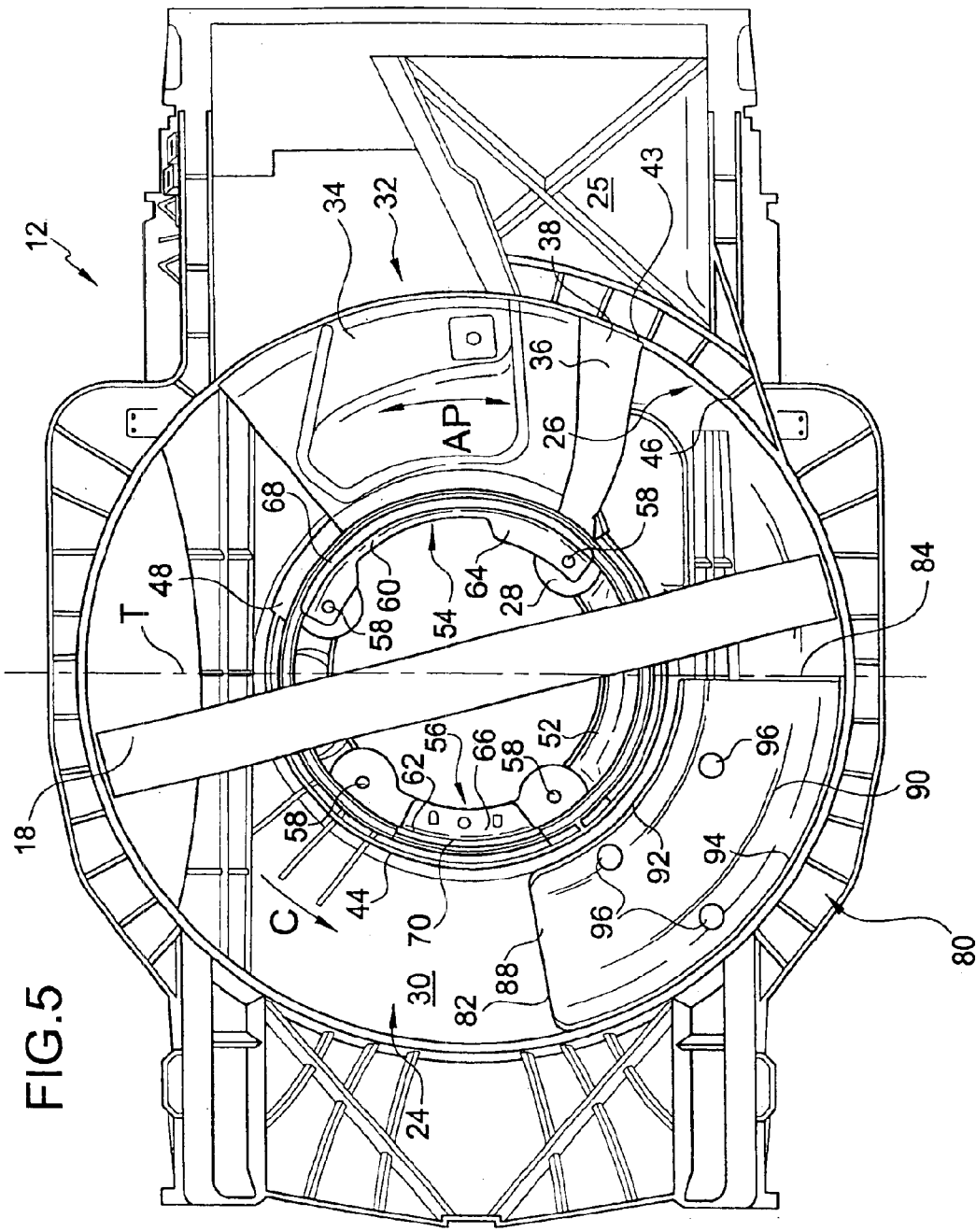
FIG. 5 is a plan view of the bottom of the lawnmower of FIG. 2 showing the lawnmower accessory in an intermediate position.
Figure 6:
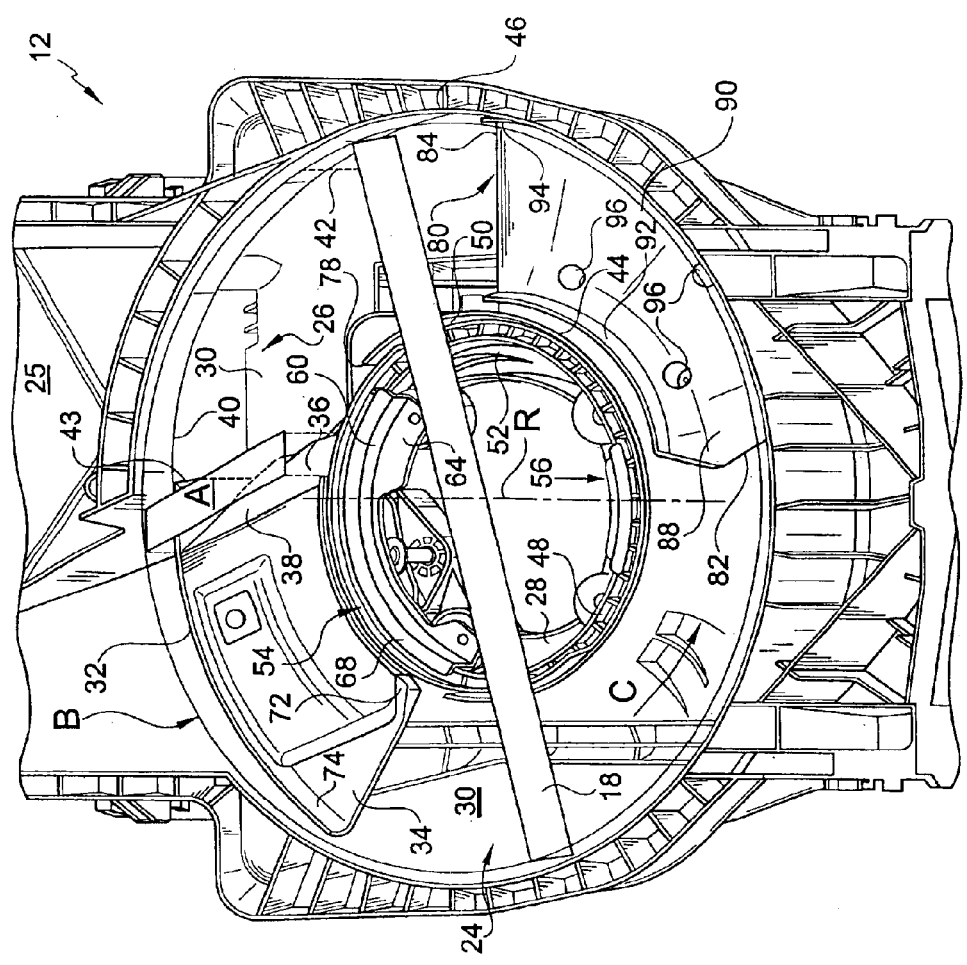
FIG. 6 is a front perspective view of the bottom of the lawnmower of FIG. 2.
Figure 7:
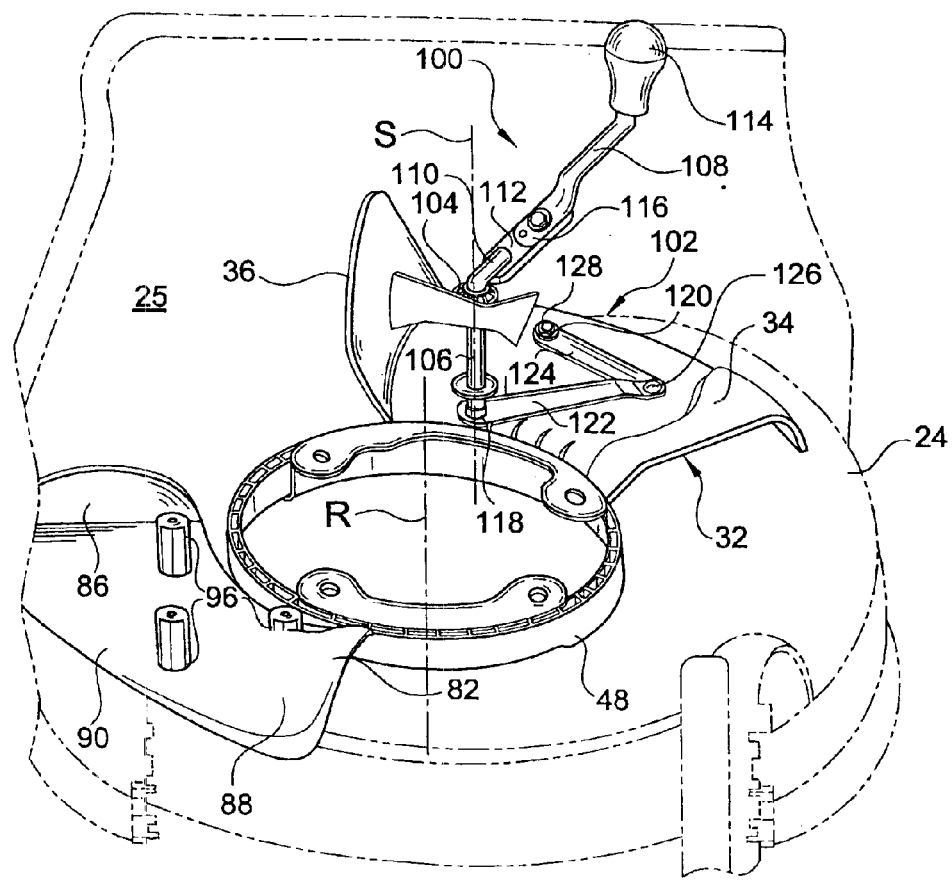
FIG. 7 is a partial front perspective view of the top of the lawnmower of FIG. 2 with the lawnmower deck shown in phantom and showing an actuation transmission according to the invention.
Figure 8:
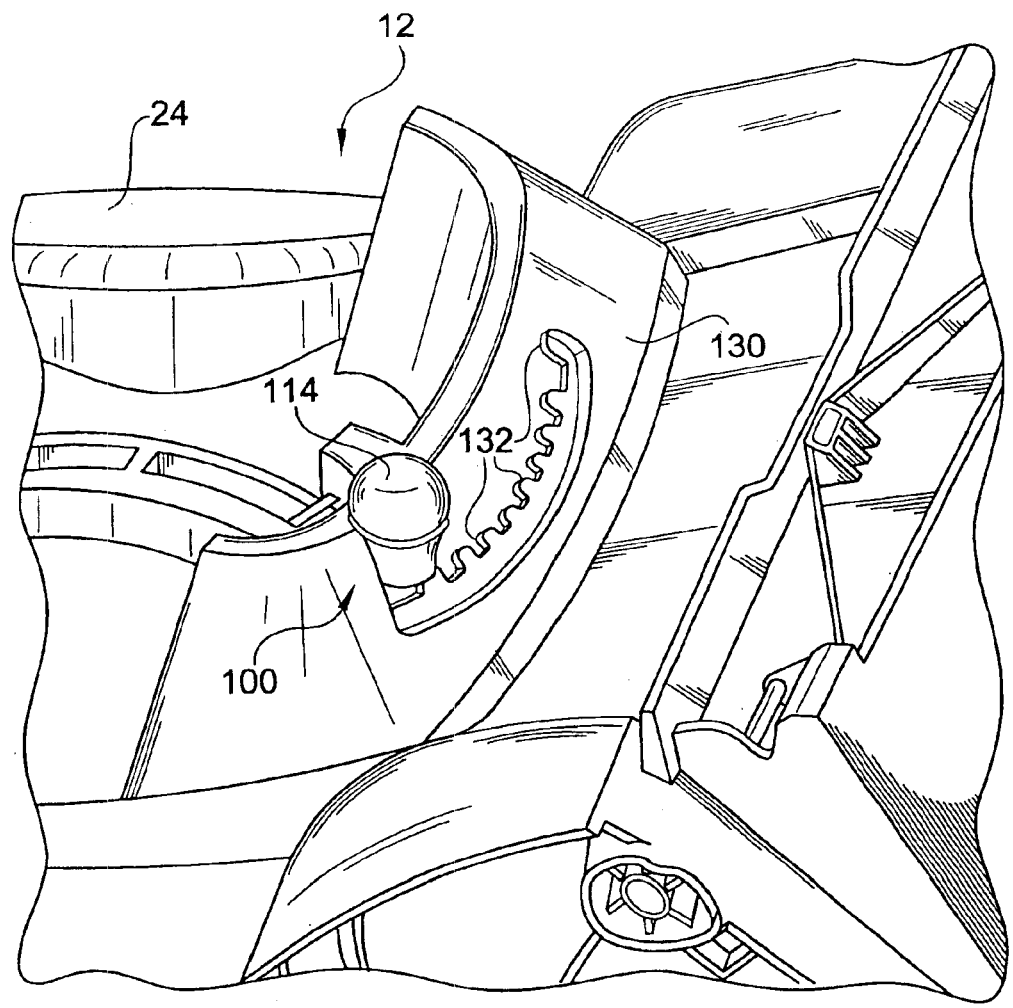
FIG. 8 is a partial rear perspective view of the top of the lawnmower of FIG. 2 showing a portion of the actuation transmission according to the invention.

FIGS. 2 and 4–6 show the deck 12 upside down relative to FIG. 1. FIG. 3 depicts the plate 32 (described below) upside down relative to FIG. 1. FIGS. 7 and 8 show the deck 12 right side up relative to FIG. 1.

Referring to FIGS. 1, 2 and 4–7, the deck 12 includes a toroidal cutter housing 24 and a discharge chute 25 extending from the toroidal cutter housing 24. The toroidal cutter housing 24 includes a discharge opening 26 at the junction of the cutter housing 24 and the discharge chute 25. The collection bag 22 can be connected to the discharge chute 25 to collect the clippings for disposal away from the lawn.

The deck 12 also includes an engine mount 28 centrally positioned on the cutter housing 24. As shown in FIG. 1, the prime mover 16 is supported on the engine mount 28.

The blade 18 is coupled to the prime mover 16 (omitted from FIG. 7 for clarity) to rotate within the cutter housing 24. Preferably, the blade 18 is a mulching blade configured as either a single cutting element or as multiple cutting elements. As shown in FIG. 6, the blade 18 rotates about a rotation axis R in a blade circle B lying in a cutting plane.

The vegetation is cut at the level of the cutting plane and circulates adjacent the roof 30 of the cutter housing 24 along a circulation path C until a saturation amount of circulating clippings is reached. Upon reaching the saturation level, the circulating clippings begin to fall back down across the blade 18 where they are cut again and blown into the lawn below the level of the cutting plane.

Figure 2:
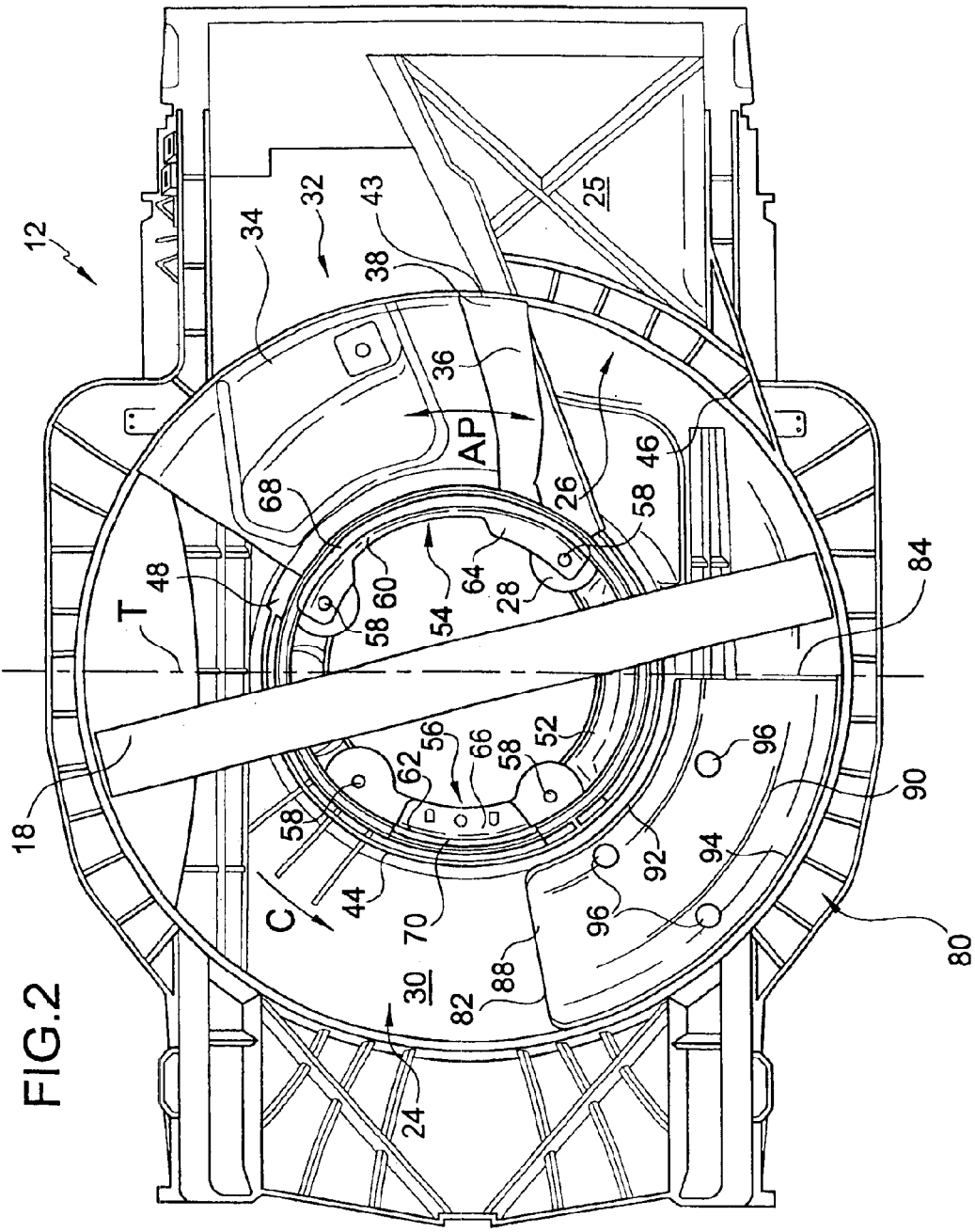
FIG. 2 is a plan view of the bottom of a lawnmower including a lawnmower accessory in a first position according to the present invention
Figure 3:
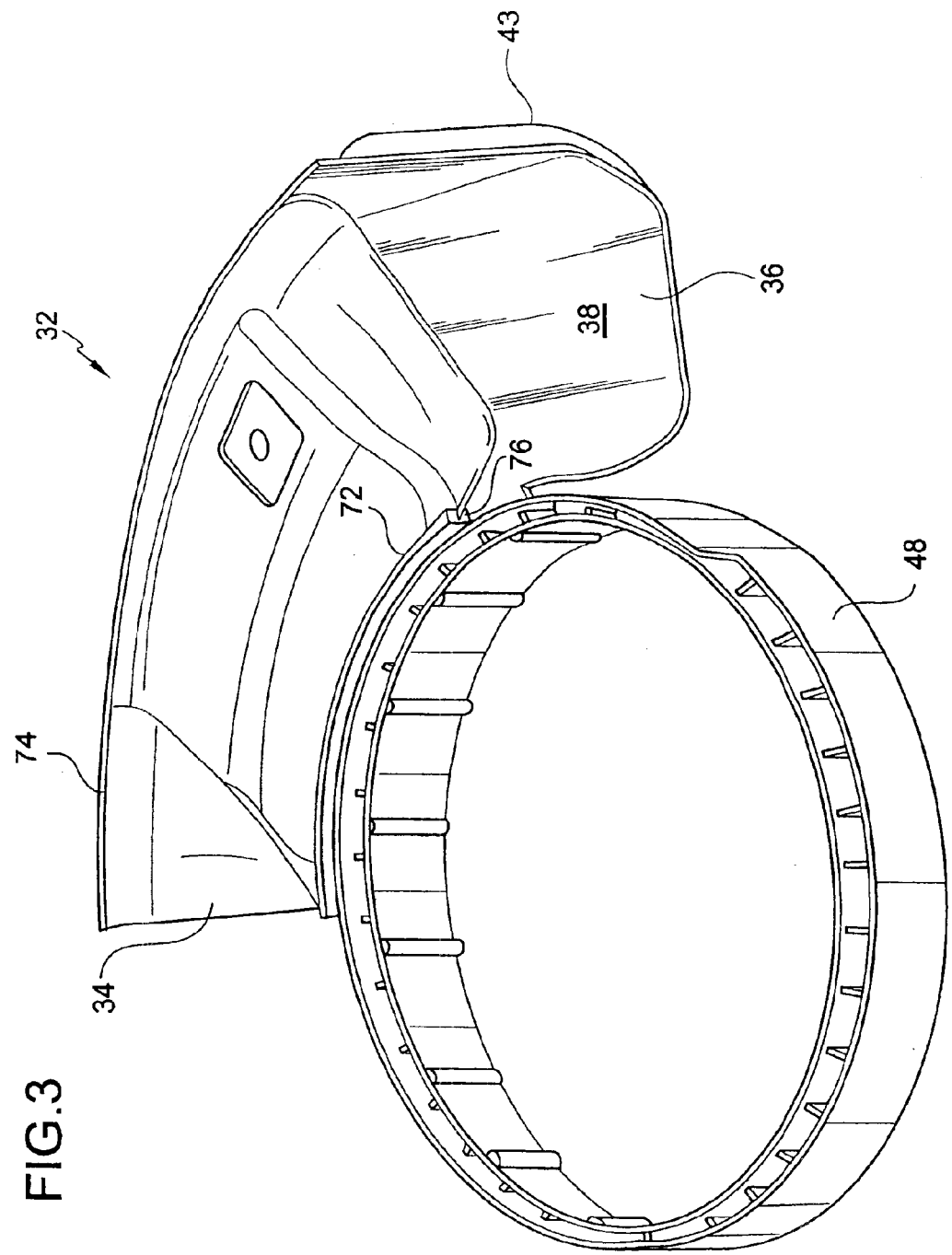
FIG. 3 is a perspective view of the bottom of the lawnmower accessory of FIG. 2.
Figure 4:
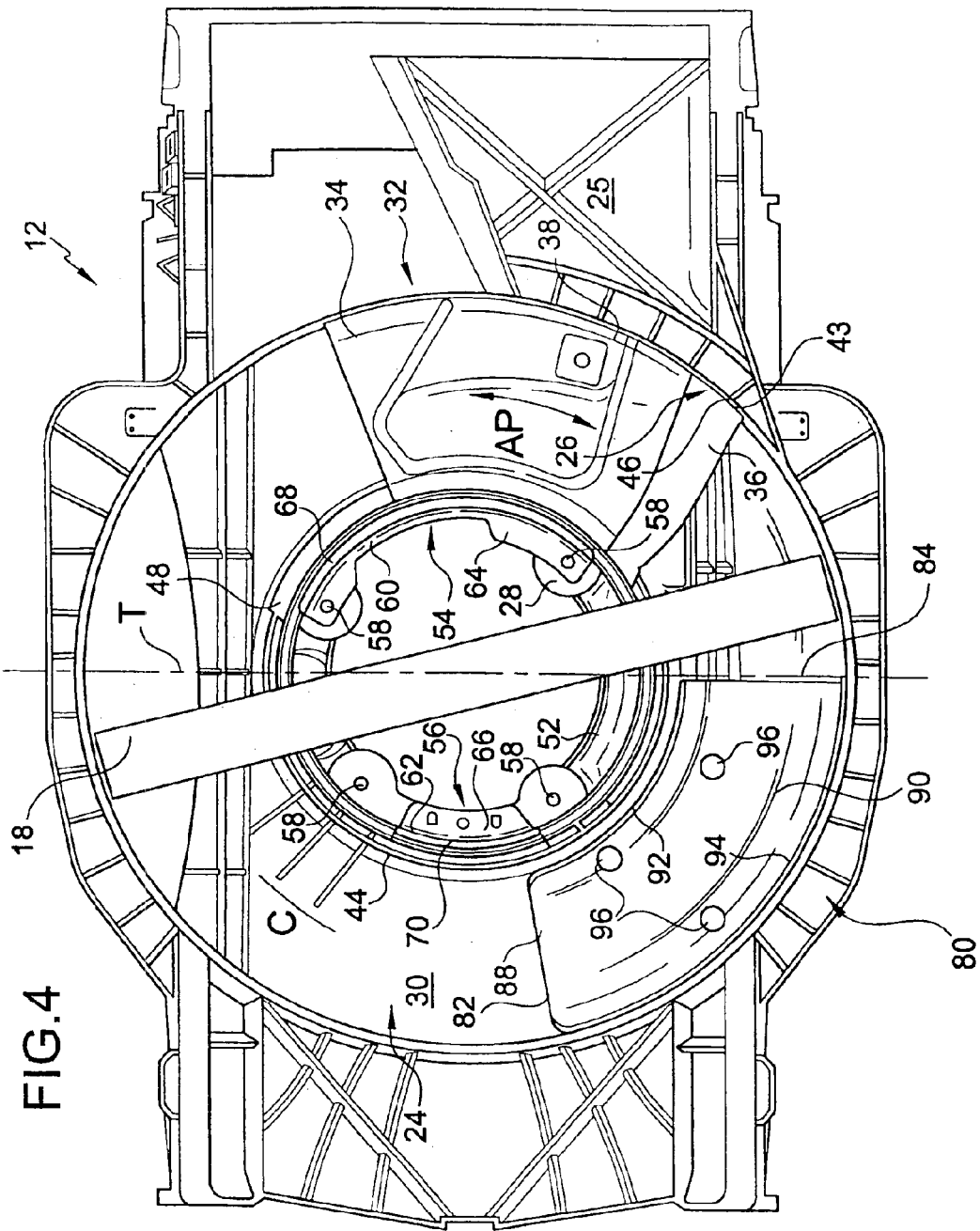
FIG. 4 is a plan view of the bottom of the lawnmower of FIG. 2 showing the lawnmower accessory in a second position.

FIGS. 2–7 show a lawnmower accessory configured as a plate 32 that translates within the cutter housing 24 between a first position (FIG. 2) and a second position (FIG. 4). The plate 32 translates along an arcuate path AP between the first position and the second position. During such arcuate translation, every point of the plate 32 is displaced between a corresponding first position and a corresponding second position spaced by a respective arcuate distance.

The first position can be a full bagging position where the discharge opening 26 is substantially unobstructed by the plate 32 (FIG. 2) and the second position can be a full mulching position where the plate 32 substantially obstructs the discharge opening 26 (FIG. 4). Additionally, the plate 32 can translate to at least one position intermediate the first position and the second position (FIG. 5). Preferably, the cutter housing 24 is annular and the plate 32 extends circumferentially across a sector of the cutter housing 24.

Referring to FIGS. 3 and 6, the plate 32 includes a horizontal wall 34 extending parallel to the blade circle B and a cover 36 extending from the horizontal wall 34 and upwardly away from the cutting plane. The cover 36 extends obliquely from the horizontal wall 34. The cover 36 has a major operating face 38 that extends obliquely so that it projects an area A onto the blade circle B at a location where the plate 32 overlaps the cutting plane as the plate 32 moves between the full bagging position and the full mulching position. Preferably, as shown in FIG. 6, the cover 36 overlaps the cutting plane within the perimeter of the blade circle B and the projected area A lies within the blade circle B. Alternatively, the location and/or size of any combination of the discharge opening 26, the cover 36 and the cutter housing 24 can be changed from that illustrated in FIGS. 2–7 such that the projected area A can lie partially or completely outside of the blade circle B.

Referring to FIGS. 2, 4 and 5, the lawnmower 10 is convertible between a first operational mode and a second operational mode by translating the cover 36 across the discharge opening 26 between the full bagging position (FIG. 2) where cover 36 is laterally spaced from the discharge opening 26 and the full mulching position (FIG. 4) where the cover 36 spans the discharge opening 26. Preferably, the cover 36 additionally can translate to at least one position intermediate (FIG. 5) the full bagging position and the full mulching position where the cover 36 partially obstructs the discharge opening 26. The lawnmower 10 is in an intermediate operational mode when the cover 36 is in the at least one intermediate position. The cover 36 translates between each of the full bagging position, the at least one intermediate position and the full mulching position along the arcuate path AP.

As shown in FIGS. 2–7, the major operating face 38 controls the circulation of the clippings within the cutter housing 24. As the major operating face 38 translates between the full bagging position and the full mulching position, the major operating face 38 extends by various degrees into the circulation path C of the clippings circulating in the cutter housing 24. The circulating clippings that strike the major operating face 38 of the cover 36 are redirected by the cover 36 from the roof 30 of the cutter housing 24 toward the blade 18 where they are mulched and blown into the lawn by the blade 18. When the cover 36 is in the full mulching position (FIG. 4), the discharge opening 26 is substantially obstructed by the cover 36 so that substantially all of the circulating clippings are redirected toward the blade 18 for mulching. When the cover 36 is in any position (FIG. 2 or 5) other than the full mulching position, at least a portion of the discharge opening 26 is unobstructed so that at least some of the circulating clippings can escape from the cutter housing 24 through the discharge opening 26 while the remaining circulating clippings can be mulched.

The discharge opening 26 has a first effective cross-sectional area when the cover 36 is in the full bagging position (FIG. 2), a second effective cross-sectional area when the cover 36 is in the at least one intermediate position (FIG. 5), and a third effective cross-sectional area when the cover 36 is in the full mulching position (FIG. 4).

Referring to FIGS. 2, 3 and 6, the first effective cross-sectional area is defined by a bottom edge of the discharge opening 26, the roof 30, an outer edge 42 (indicated by dotted line), and an outer edge 43 of the plate 32, where the plate 32 is in the first position. The first effective cross-sectional area is the maximum cross-sectional area for the discharge opening 26.

Referring to FIGS. 5 and 6, placing the cover 36 in the at least one intermediate position provides a second effective cross-sectional area that is less than the first effective cross-sectional area. The second effective cross-sectional area is defined by the bottom edge 40, the roof 30, the outer edge 42, and outer edge 43 of the plate 32, where the plate 32 is in the at least one intermediate position. A comparison of FIGS. 2 and 5 shows that when in the at least one intermediate position, the outer edge 43 of the plate 32 lies intermediate the full bagging position and the outer edge 42, such that the second effective cross-sectional area is less than the first effective cross-sectional area. The plate 32 can be placed in any one of a plurality of intermediate positions and each intermediate position has a unique effective cross-sectional area.

Referring to FIGS. 4 and 6, placing the cover 36 in the full mulching position provides an third effective cross-sectional area, which is defined by the bottom edge 40, the roof 30, the outer edge 42, and the outer edge 43 of the plate 32, where the plate 32 is in the second position. In this position, the outer edge 43 of the plate 32 is adjacent the outer edge 42 and the third effective cross-sectional area is approximately zero. A comparison of FIGS. 4 and 5 shows that the third effective cross-section is less than the second effective cross-sectional area and a comparison of FIGS. 2 and 5 shows that the third cross-sectional area is less than the first effective cross-sectional area.

Under adverse mowing conditions, such as wet vegetation, tall vegetation or thick vegetation, the clippings can clog the discharge opening 26 before the collection bag 22 is full or cause clumping even when mulching the clippings. Also, when such mowing conditions exist when the lawnmower is in the full mulching mode, the amount of clippings circulating in the cutter housing 24 can overwhelm the prime mover 16 and cause it to stall. These results can require repeated stopping and starting of the lawnmower which, in turn, can extend the time necessary to mow the lawn.

By regulating the position of the cover 36 in response to the cutting conditions, the operator can control the amount of grass being collected and mulched at any given time so that clogging, clumping and prime mover 16 stalling can be minimized during these adverse mowing conditions. With the cover 36 in the full mulching position, the operator can translate the cover 36 toward the full bagging position if the clippings begin to clump until enough of the clippings pass through the discharge opening 24 and into the collection bag 22 such that the stalling condition ceases. Conversely, with the cover 36 in the full bagging position, the operator can continue to mow when the access to the collection bag 22 becomes clogged with clippings by positioning the cover 36 in any position other than the full bagging position so that at least some of the clippings are mulched. Positioning the cover 36 in any one of the intermediate positions minimizes unwanted clumping or stalling of the prime mover 16 because some of the clippings escape the cutter housing 24 through the discharge opening 26 and are collected in the collection bag 22 while the remainder get mulched.

Referring to FIGS. 2 and 4–6, the cutter housing 24 can also include an inner scroll 44 and an outer scroll 46. The inner scroll 44 is centered about the engine mount 28 and located at the inner radius of the cutter housing 24. The outer scroll 46 is centered about the inner scroll 44 and located at the outer radius of the cutter housing 24. The discharge opening 26 (FIGS. 2, 3 and 7) is in the outer scroll 46. The plate 32 extends radially from the inner radius to the outer radius to span from the inner scroll 44 to the outer scroll 46 in each of the first (e,g, full bagging) position, the second (e.g., full mulching) position and the at least one intermediate position. Preferably, the arcuate path AP is concentric to each of the inner scroll 44 and the outer scroll 46.

Referring to FIGS. 2–7, the plate 32 is connected to a mounting ring 48 adjacent to the horizontal wall 34. The mounting ring 48 is rotatably mounted to the cutter housing 24 adjacent the inner scroll 44. The mounting ring 48 is concentric with the blade circle B and rotates about the rotational axis R. The mounting ring 48 slides along the inner face 50 of the inner scroll 44 and a radial flange 52 of the engine mount 28 as it rotates.

Referring to FIGS. 2 and 4–6, after placing the mounting ring 48 and the plate 32 in the cutter housing 24 a first ring retainer 54 and a second ring retainer 56 are used to retain the plate 32 and the mounting ring 48 in the cutter housing 24. The ring retainers 54, 56 can be secured to the engine mount 28 by the fasteners (not shown, but generally indicated at 58) used to secure the prime mover 16 to the engine mount 28.

The mounting ring 48 is slidably received between the inner scroll 44 and the ring retainers 54, 56. Each of the ring retainers 54, 56 extends along a respective portion of the mounting ring 48 and each includes an arcuate wall 60, 62, a radial flange 64, 66 and a lip 68, 70. The arcuate walls 60, 62 are concentric with and spaced from the inner face 50 of the inner scroll 44. The radial flanges 64, 66 extend from the arcuate walls 60, 62 and are connected to the engine mount 28 at locations 58. The lips 68, 70 extend from the arcuate walls 60, 62 toward the inner scroll 44 and over the mounting ring 48. The mounting ring 48 is captured between the inner face 50 of the inner scroll 44, the radial flange 52 of the engine mount 28, arcuate walls 60, 62 of the ring retainers 54, 56 and the lips 68, 70 of the ring retainers 54, 56. The arc length of the second ring retainer 56 is less than the arc length of the first ring retainer 54.

Referring to FIGS. 3 and 6, the plate 32 includes an inner flange 72 extending from the horizontal wall 34 toward the blade circle B and an outer flange 74 extending from the horizontal wall 34 toward the blade circle B. The inner flange 72 extends into a recess (not numbered) in the inner scroll 44 and the inner flange 72 includes an end 76 that abuts a stop 78 in the inner scroll 44 when the plate 32 is in the full mulching position. The outer flange 74 is radially inward of the outer scroll 46 and slides along the outer scroll 46.

Preferably, the mounting ring 48 is integrally formed as a single piece with the plate 32 and connected to the plate 32 adjacent to the inner flange 72. Alternatively, the mounting ring 48 can be formed separately from the plate 32 and then secured to the plate 32 by mechanical fasteners, adhesive, welding or other similar fastening technique. The mounting ring 48 can be made from plastic or metal.

FIGS. 2–7 illustrate the plate 32 as having the horizontal wall 34, the cover 36, the inner flange 72 and the outer flange 74 integrally formed as a single piece. Alternatively, these components can be formed individually or as various sub-assemblies and then secured together by mechanical fasteners, adhesive, welding or other similar fastening technique. The plate 32 can be made from plastic or metal or a combination of different materials optimized to promote the particular function of each component 34, 36, 72, 74 of the plate 32 and/or assembly of the plate 32 into the cutter housing 24.

As shown in FIGS. 2 and 4–7, a ramp 80 is mounted to the roof 30 of the cutter housing 24 near the late 32. As will be discussed below, the ramp 80 cooperates with the plate 32 to divert clippings in the circulation path C into the discharge opening 26 when the plate 32 is in any position other than the full mulching position.

The ramp 80 is arcuate and extends from the inner scroll 44 to the outer scroll 46. The ramp 80 includes a leading edge 82 adjacent the roof 30 and a trailing edge 84 spaced from the roof 30 by a rear face 86 (FIG. 7). Referring to FIG. 7, the rear face 86 extends from the trailing edge 84 to the roof 30 and conforms to the interior profile of the cutter housing 24. Preferably, the trailing edge 84 lies approximately co-planar with horizontal wall 34 and proximate the cover 36 when the plate in is the full mulching position. The ramp 80 can divert clippings from the roof 30 toward the blade 18 to a level at least even with the horizontal wall 34. Preferably, the spacing between the trailing edge 84 and the plate 32 is sufficiently small so that the updraft created by the blade 18 does not strongly redirect the clippings at the cover 36. The trailing edge 84 is aligned with a transverse axis T passing through the center of the blade circle B (FIG. 6) and coplanar with the cutting plane, as viewed in FIGS. 2, 4 and 5. However, the trailing edge 84 can have other orientations in the cutter housing 24 that do not aim the circulation path C directly at the cover 36.

The change in direction from the roof 30 toward the blade circle B and the back toward the roof 30 for the circulating clippings reduces the potential for the clippings to clump onto the plate 32 when the plate 32 is any position other than the full mulching position. Clumps formed in the plate 32 can adversely obstruct the circulation path C and reduce the efficiency at which the clippings are bagged and/or mulched.

The ramp 80 further includes a sloped portion 88, a horizontal portion 90, an inner flange 92 and an outer flange 94. The sloped portion 88 extends from the leading edge 82 and the horizontal portion 90 extends from the sloped portion 88 to the trailing edge 84. The inner flange 92 and the outer flange 94 extend along and conform to the inner scroll 44 and the outer scroll 46, respectively.

The ramp 80 can be secured to the roof 30 of the cutter housing 24 by mounting bosses 96 adapted to receive fasteners, such as self-tapping screws (not shown). Alternatively, the ramp 80 can be integrally formed in the roof 30 of the cutter housing 24. The length of the ramp 80 as measured in the direction of the circulation path C and the inclination of the ramp 80 can be any desired size.

This diversion of the clippings can reduce the amount of clippings striking the plate 32 or at least soften the impact of the clippings onto the plate 32. By reducing the amount of clippings striking against the plate 32, the potential for the clippings to clump onto the cover 36 when the plate 32 is a position other than the full mulching position can be reduced. Clumping on the cover 36 and/or other portions of the plate 32 can obstruct the circulation path C and reduce the efficiency at which the clippings are bagged and/or mulched.

The ramp 80 can also extend the area of the lawn over which the lawnmower 10 traverses while mowing before the collection bag 22 requires emptying when the plate 32 is in any position other than the full mulching position. The ramp 80 could divert a portion of the clippings across the blade 18 so that they are mulched by the blade 18 and blown into the lawn. Thus, the amount of clippings collected in the collection bag 22 can be reduced. Although the ramp 80 is not necessary for effective operation of the plate 32, the ramp 80 can enhance the performance offered by the plate 32.

FIGS. 7 and 8 show a handle 100 and an actuation transmission 102. As shown in FIG. 7, the handle 100 is connected to the cover 36 and extends external to the cutter housing 24. The handle 100 is pivotally supported on the deck 12 by a mount 104 and is displaceable between a first position, a second position and at least one position intermediate the first position and the second position. Placement of the handle 100 in the first position translates the cover 36 to the full bagging position. Placement of the handle 100 in the second position translates the cover 36 to the full mulching position. Placement of the handle 100 in the at least one intermediate position translates the cover 36 to the at least one intermediate position.

The handle 100 includes a pivot shaft 106 and a grip section 108 resilient coupled to the pivot shaft 106, as will be explained below. The pivot shaft 106 rotates in the mount 104 about a shaft axis S spaced from the rotation axis R and includes an angled portion 110 terminating in a mounting flange 112. The grip section 108 includes a knob 114 atone end of the grip section 108 and a mounting flange 116 at the other end of the grip section 108. The mounting flange 116 of the grip section 108 is secured to the mounting flange 112 of the pivot shaft 106.

The actuation transmission 102 includes a linkage (not numbered) with a first end 118 connected to the handle 100 and a second end 120 connected to the cover 36 by way of the horizontal wall 34. The linkage includes a first link 122 fixed to the pivot shaft 106 and a second link 124 pivotally connected to the first link 122 and to the horizontal wall 34 by pivots 126, 128.

Referring to FIG. 8, a selector plate 130 is mounted on the deck 12 external to the cutter housing 24 and includes a plurality of slots 132 selectively receiving the handle 100. Referring also to FIG. 7, the mounting flange 116 of the grip portion 108 is resilient and biases the handle 100 toward engagement with any one of the plurality of slots 132 to secure the cover 36 in a position between the full bagging position and the full mulching position. Thus, the cover 36 can be positioned in a plurality of discrete positions between the full bagging position and the full mulching position, where each of the plurality of positions corresponds to a respective one of the plurality of slots 132 in the selector plate 130. Other arrangements, such as a geared arrangement, other kinematic arrangements or a cable linkage, can be employed in place of the handle 100 and the actuation transmission 102 to move the plate 32 between the full bagging position, the at least one intermediate position and the full mulching position.

Although the preferred embodiments illustrate a small walk-behind lawnmower, the invention is also intended for use on commercial walk-behind mowers, riding mowers and lawn tractors.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A lawnmower convertible between a bagging mode and a mulching mode, the convertible lawnmower comprising:

a cutter housing having a discharge opening;

an engine mount centrally positioned on the cutter housing;

a prime mover supported on the engine mount;

a mulching blade coupled to the prime mover to rotate about a first axis and in a blade circle within the cutter housing;

a mounting ring mounted in the cutter housing concentric to the first axis and mounted to rotate in the cutter housing about the first axis;

a cover connected to the mounting ring and adapted to translate within the cutter housing between a full bagging position where the discharge opening is at least substantially unobstructed by the cover, a full mulching position where the cover at least substantially obstructs the discharge opening and at least one position intermediate the full bagging position and the full mulching position; and a handle connected to the cover and extending external to the cutter housing, the handle being displaceable between a first position, a second position and at least one position intermediate the first position and the second position such that displacement of the handle between each of the first position, the second position and the at least one intermediate position of the handle translates the cover between each of the full bagging position, the full mulching position and the at least one intermediate position of the cover, respectively.

2. The convertible lawnmower according to claim 1, further comprising:

a linkage including a first end connected to the handle and a second end connected to the cover; and a selector plate mounted external to the cutter housing and including a plurality of slots selectively receiving the handle;

wherein the handle is selectively received in any one of the plurality of slots to secure the cover in a corresponding plurality of discrete positions between and including the full bagging position and the full mulching position.

3. The convertible lawnmower according to claim 2, wherein the handle is pivotable about a second axis spaced from the center of the blade circle; and the linkage further comprises:
   a first link fixed to the handle; and
   a second link pivotally coupled to the first link and pivotally coupled to the cover.

4. A lawnmower convertible between a bagging mode and a mulching mode, the convertible lawnmower comprising:
   a cutter housing having a discharge opening;
   an engine mount centrally positioned on the cutter housing;
   a prime mover supported on the engine mount;
   a mulching blade coupled to the prime mover to rotate about a first axis and in a blade circle within the cutter housing;
   a mounting ring in the cutter housing concentric to the first axis and mounted to rotate in the cutter housing about the first axis;
   a cover connected to the mounting ring and adapted to translate within the cutter housing between at least a full bagging position where the discharge opening is at least substantially unobstructed by the cover and a full mulching position where the cover at least substantially obstructs the discharge opening; and
   a handle connected to the cover and extending external to the cutter housing, the handle being displaceable between at least a first position and a second position such that displacement of the handle between the first position and the second position translates the cover between at least the first position and the second position.

5. The convertible lawnmower according to claim 4, further comprising:
   a linkage connecting the handle and the cover;
   a selector plate mounted external to the cutter housing and including a plurality of slots for selectively receiving the handle;
   wherein the handle can be selectively received in any one of the plurality of slots to secure the cover in a corresponding plurality of discrete positions between and including the full bagging position and the full mulching position.

6. The convertible lawnmower according to claim 5, wherein the handle is pivotable about a second axis spaced from the center of the blade circle; and
   the linkage further comprises:
      a first link fixed to the handle; and
      a second link pivotally coupled to the first link and pivotally coupled to the cover.

* * * * *